US008762607B2

(12) United States Patent
Cox et al.

(10) Patent No.: US 8,762,607 B2
(45) Date of Patent: Jun. 24, 2014

(54) MECHANISM FOR FACILITATING DYNAMIC MULTI-MODE MEMORY PACKAGES IN MEMORY SYSTEMS (75) Inventors: Christopher E. Cox, Placerville, CA (US); Christopher P. Mozak, Beaverton, OR (US); Rebecca Z. Loop, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/539,179

(22) Filed: Jun. 29, 2012

(65) Prior Publication Data
US 2014/0006770 A1    Jan. 2, 2014

(51) Int. Cl.
G06F 13/38    (2006.01)
(52) U.S. Cl.
USPC ................................. 710/64; 710/74
(58) Field of Classification Search
None
See application file for complete search history.

(56) References Cited

U.S. PATENT DOCUMENTS

| 6,473,831 | B1 * | 10/2002 | Schade ......................... 711/115 |
| 6,590,827 | B2 * | 7/2003 | Chang et al. ................ 365/233.1 |
| 6,765,812 | B2 * | 7/2004 | Anderson ........................ 365/51 |
| 7,099,175 | B2 * | 8/2006 | Lee et al. ......................... 365/63 |
| 7,970,980 | B2 * | 6/2011 | Hillier et al. ...................... 711/5 |
| 8,397,013 | B1 * | 3/2013 | Rosenband et al. .......... 711/103 |
| 2005/0262388 | A1 | 11/2005 | Dahlen et al. |
| 2006/0126384 | A1 | 6/2006 | Yu et al. |
| 2006/0145323 | A1 * | 7/2006 | Lee ............................... 257/679 |
| 2007/0250677 | A1 | 10/2007 | Ware et al. |
| 2008/0082751 | A1 * | 4/2008 | Okin et al. ..................... 711/115 |
| 2009/0089474 | A1 * | 4/2009 | Lai et al. ........................ 710/301 |
| 2010/0005217 | A1 | 1/2010 | Jeddeloh |
| 2010/0115200 | A1 * | 5/2010 | Papagrigoriou .............. 711/115 |
| 2010/0262790 | A1 | 10/2010 | Perego et al. |

FOREIGN PATENT DOCUMENTS

| GB | 2228348 | A | * | 8/1990 | ............. G06F 13/16 |
| JP | 08235058 | A | * | 9/1996 | ............. G06F 12/06 |
| JP | 2008152687 | A | * | 7/2008 | |
| JP | 2011204229 | A | * | 10/2011 | |

OTHER PUBLICATIONS

Micron, Low-Power Versus Standard DDR SDRAM, 2007, Micron, pp. 1-8.*
PCT/US2013/044577, International Search Report and Written Opinion of the International Searching Authority, 6 pages, mailed Sep. 13, 2013.

* cited by examiner

Primary Examiner — Cheng-Yuan Tseng
(74) Attorney, Agent, or Firm — Blakely, Sokoloff, Taylor & Zafman LLP (57) ABSTRACT A mechanism is described for facilitating dynamic multi-mode memory packages in memory systems according to one embodiment of the invention. A method of embodiments of the invention includes maintaining a plurality of memory modes on a single memory package at a motherboard of a computing system. The plurality of memory modes is associated with a plurality of physical organizations of memory devices. The method may further include receiving a request to switch from a first memory mode to a second memory mode of the plurality of memory mode, and dynamically switching from the first memory mode to the second memory mode, in response to the request.

24 Claims, 5 Drawing Sheets

MECHANISM FOR FACILITATING DYNAMIC MULTI-MODE MEMORY PACKAGES IN MEMORY SYSTEMS

FIELD

Embodiments of the invention relate to memory systems. More particularly, embodiments of the invention relate to a mechanism for facilitating dynamic multi-mode memory packages in memory systems.

BACKGROUND

With the ever increasing popularity, need, and importance a System on a Chip or System on Chip (SoC)-like integrated circuits integrating or consolidating all components of a computer system on a single integrated circuit, footprints, cost, and power consumption are also at a rise. For example, conventional memory systems are cost-inefficient and power-consuming as they require a separate package for each memory mode (e.g., memory modes or module setups suitable for different computer systems, such as desktop computers, mobile computers, etc.)

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in details in order not to obscure the understanding of this description.

In one embodiment, a mechanism is provided to employ multiple memory modes on single memory package and facilitate dynamic switching between two or more of the multiple memory modes at the package based on user selection. In this case, a memory mode refers to an arrangement for connecting a memory controller to multiple memory devices, where memory devices are arranged on a board, a package, a dual inline memory module (DIMM), or the like. Each arrangement constitutes a memory mode. Memory modes are reflected in the memory controller silicon by re-arranging Central Processing Unit (CPU) pins and/or bump physical locations to allow for routing between the memory controller and memory, such as a dynamic random access memory (DRAM), in the most efficient manner possible, such as by reducing layer count, board real-estate, system cost, etc., and providing the best signal integrity, etc. In one embodiment, data output buffers are dynamically selected and used for data based on the changing selection of their corresponding memory modes.

Figure 1:
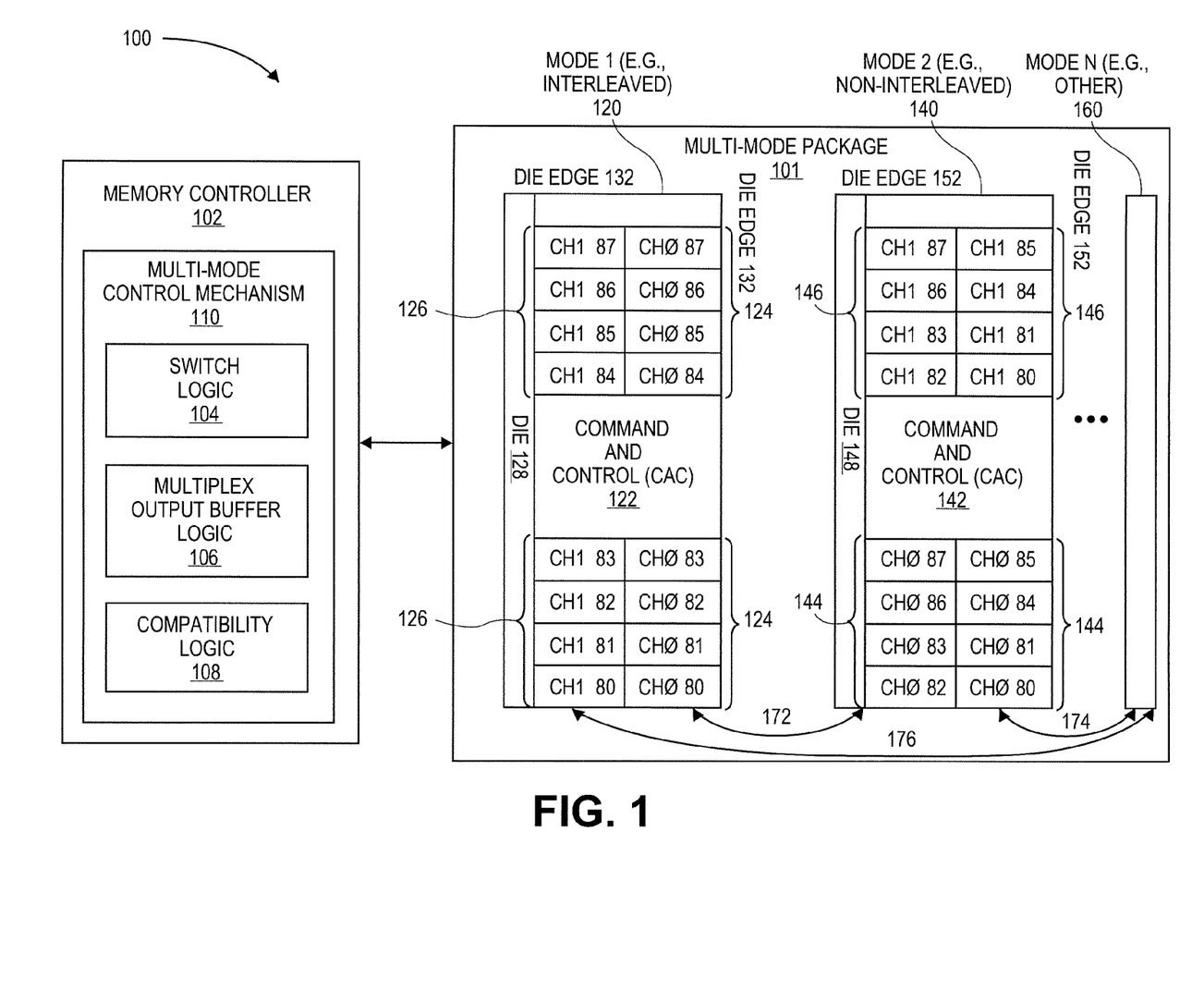
FIG. 1 illustrates an embodiment of dynamic multiple-mode control mechanism according to one embodiment.

FIG. 1 illustrates an embodiment of dynamic multiple-mode control mechanism 110 according to one embodiment. In one embodiment, memory controller 102 of a memory system 100, at a motherboard, of a computer system (such as computer system 400 of FIG. 4) is shown as employing dynamic multi-mode control mechanism ("control mechanism") 110 is illustrated as having switch logic 104, multiplex output buffer logic ("output logic") 106, and compatibility logic 108. In one embodiment, multi-mode package 101 represents a single package that employs multiple memory modes, such as mode 1 120 (e.g., interleaved mode), mode 2 140 (e.g., non-interleaved mode), and mode N 160 representing any other type or number of modes. Although this document primarily discusses interleaved and non-interleaved modes 120 and 140, it is contemplated the embodiments of the present invention are not limited to these two modes and any other number and types of existing or future memory modes may be applied and are referred to in this document as mode N 160. Memory controller 102 may be employed at its own integrated circuit or be part of processor 410 or memory 420 of FIG. 4.

In one embodiment, a multiplexor driven out novel pin matrix is introduced that is compatible with different memory devices or systems, such as double data rate (DDR) (e.g., DDR1, DDR2, etc.) memory, herein referred to as DDRx, low power DDR (LPDDR) memory, herein referred to as LPDDRx, and the like, so that these memory devices can be accommodated through their corresponding modes 120, 140, 160 on a single multi-mode package 101 of a computer motherboard. Further, reparation of DQ pins is provided to allow for multiple modes, such interleaved 120 or non-interleaved 140 modes by simply changing a control bit as facilitated by switch logic 104 of control mechanism 110. This allows for control of different routing strategies, such as between DDRx DIMM configuration and LPDDRx (memory down) configuration, or the like. The novel multi-mode package 101 further allows for better a stock keeping unit (SKU) management and reduced die.

In the illustrated embodiment, specific quadrants relating to, for example, a driver location on the silicon die, etc., are used to make them compatible with internal controls of multiple memory devices, such as DDRx and LPDDRx controllers. Further, control and command (CAC) pins 122, 142 may be kept in the center of the DDR port on the silicon die with DQs 124, 126, 144, 146 on the outside edges, such as laying out in this format allows for reconfiguration of these DQs 124, 126, 144, 146 in such a way that multiple modes, such as interleaved mode 120, non-interleaved mode 140, and other modes 160 may be employed on and supported by a single multi-mode package 101. By way of example and not limitation, this novel technique is achieved by having memory controller 102 add one or more multiplexors to the silicon to re-arrange the data input/output (I/O) where, such as CH0 data 144 may be located at the top or bottom of the silicon, while CH1 data 146 may be, correspondingly, located at the bottom or top of the silicon or, in another mode, CH0 124 and CH1 126 may be placed side by side and may be supported by simply changing a control bit. For example and in one embodiment, a user may request a switch 172, 174, 176 between multiple modes 120, 140, 160 and, in response to the request, switch logic 104 facilitates the mode change, such as switching 172 from the interleaved mode 1 120 to the non-interleaved mode 2 140 or vice versa or to another mode, such as mode N 160, or the like. The illustrated modes 120, 140, 160 further show dies 128, 148 and die edges 132, 152.

Furthermore, in one embodiment, output logic 106 is provided to facilitate multiplexing of some or all data or data signals to their corresponding output blocks or buffers. It is contemplated that in some cases, data blocks may be remain unchanged and may be altered based on which data connects to which block. Output logic 106 may multiplex some or all of data signals, per channel control signals, memory-mapped I/O registers and/or addresses, design for test controls or any other sideband control signals, and the like. Similarly, although shown for data bus, these on-die multiplexers may be applied to either or both the data and command signals based on their individual requirements.

In one embodiment, compatibility logic 108 of control mechanism 110 facilitates compatibility with any number and types of memory devices and modes, etc. It is contemplated that the illustrated memory system 100 may include any number and type of memory modes, memory channels, memory devices, etc., and that, for example, interleaved mode 1 120 and non-interleaved mode 2 140, etc., shown here are for illustrative purposes and not to limit, in anyway, embodiments of the present invention.

It is contemplated that any number and type of components may be added to and/or removed from the control mechanism 110 to facilitate various embodiments of the invention. For brevity, clarity, and ease of understanding of the control mechanism 110, many of the standard and/or known components, such as those of a computing device, are not shown or discussed here. It is contemplated that embodiments of the invention are not limited to any particular technology, topology, system, architecture, and/or standard and are dynamic enough to adopt and adapt to any future changes.

Figure 2A:
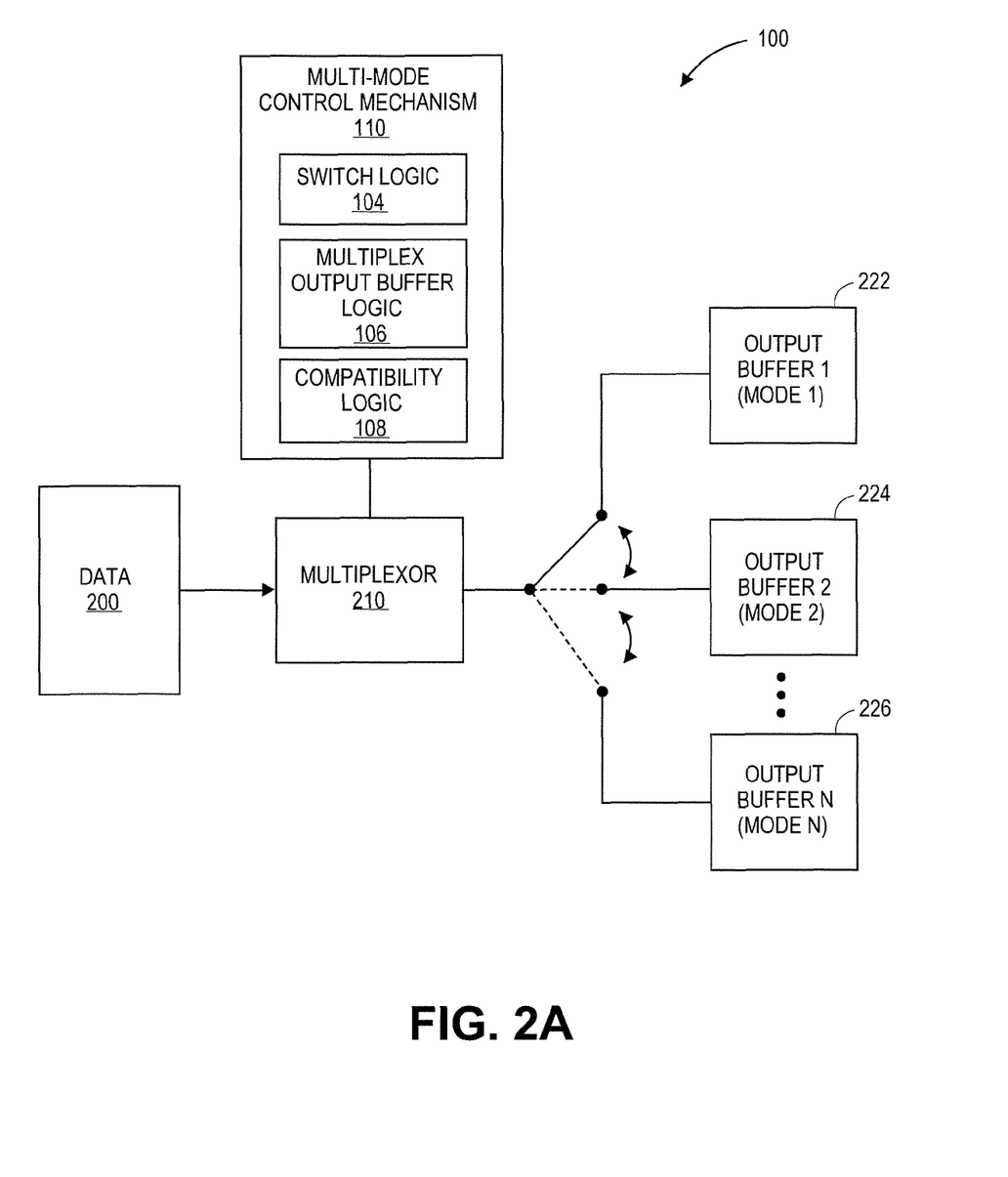
FIG. 2A illustrates an embodiment of dynamic multiple-mode control mechanism according to one embodiment.

FIG. 2A illustrates an embodiment of dynamic multiple-mode control mechanism 110 according to one embodiment. In the illustrated embodiment, one or more multiplexors 210 are employed at or made part of a die or the multi-mode package 101 that employs multiple memory device modes 120, 140, 160 as illustrated with respect to FIG. 1. In one embodiment, data 200 associated with multiple memory modes (such as interleaved, non-interleaved, etc.) is multiplexed and appropriately directed, via multiplexor 201 as facilitated by output logic 106, to a corresponding output buffer 1 222, 2 224, N 226. For example and in one embodiment, any data of data 200 associated with mode 1 (such as interleaved 120 of FIG. 1) is directed to its corresponding output buffer 1 (mode 1) 222 and, similarly, any data of data 200 associated with mode 2 (such as non-interleaved 140 of FIG. 2) to its corresponding output buffer 2 (mode 2) 224, while any data associated with other modes N are directed to their corresponding output buffers N (mode N) 226.

In one embodiment, different routing strategies employed different memory modes associated with different memory devices, such as LPDDR and DDR devices, such as with respect to x32 DRAMs as employed by LPDDRx. For example, non-interleaved channels may reduce MB channel lengths and provide opportunities to potentially reduce package layer count when used with high I/O devices, while interleaved channels, on the other hand, can be regarded as friendlier to fly-by or multi-drop buses that are commonly used with DDRx. This is further illustrated with respect to FIGS. 2A and 2B. As described with respect to FIG. 1, compatibility logic 108 works with switch logic 104 and output logic 106 to maintain and facilitate compatibility with both the existing and future memory modes and output buffers including, but not limited to, modes 120, 140, 160 of FIG. 1 and output buffers 222, 224, 226 of FIG. 2.

Figure 2B:
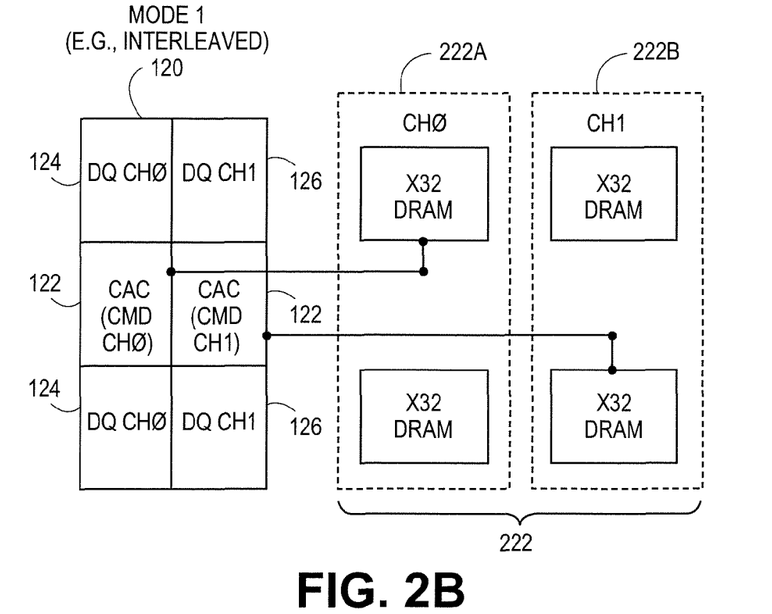
FIGS. 2B and 2C illustrate board routing for data associated with multiple modes according to one embodiment of the invention.
Figure 2C:
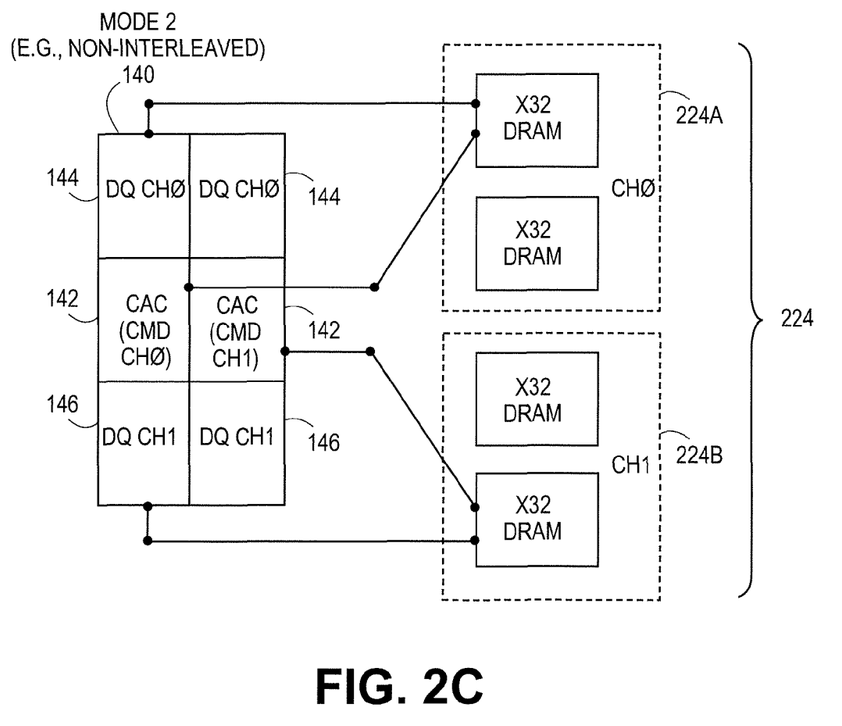

FIGS. 2B and 2C illustrate board routing for data associated with multiple modes 120, 140 according to one embodiment of the invention. The illustrated routing is associated with mode 1 120, such as an interleaved mode associated with a DDRx memory device. For brevity, some of the details previously discussed with respect to FIGS. 1 and 2A are not discussed here. As illustrated, CAC 122 for CH0 and CH 1 is placed in the middle of the die and maintains communication with interleaved CH0 and CH1 DQs 124, 126. In this case, data associated with CH0 DQs 124 is routed, via multiplexor 210, to x32 DRAM at CH0's output buffer 222A of output buffers 222. Similarly, data associated with CH1 DQs 126 is routed, via multiplexor 210, to x32 DRAM at CH1's output buffer 222B of output buffers 222.

Now referring to FIG. 2C, the illustrated routing is associated with mode 2 140, such as a non-interleaved mode associated with an LPDDRx memory device. In this case, data associated with CH0 DQs 144 is routed, via multiplexor 210, to x32 DRAM at CH0's output buffer 224A of output buffers 224. Similarly, data associated with CH1 DQs 146 is routed, via multiplexor 210, to x32 DRAM at CH1's output buffer 224B of output buffers 224. In one embodiment, some system form factors may use DRAMs to organize in rectangles (such as in FIG. 2B) or squares (such as in FIG. 2C) that may be a result of one or more of specific board layouts, components, and desired system X-Y dimensions, etc.

In one embodiment, data 200 (such as any number and type of signals, commands, etc.) associated with multiple memory modes, such as memory modes 120, 140 of FIGS. 2B and 2C and memory mode 160 of FIG. 1, is routed and/or rerouted, via multiplexor 210, to the corresponding output buffers, such as output buffers 222, 224, 226 of FIG. 2A. For example and in one embodiment, data 200 includes, but is not limited to, switching data, command signals, memory-mapped input/output (MMIO) access data, command signals, and any number and type of design-for (DFx) commands, such as design for test (DFT) commands, design for debug (DFD) commands, design for manufacturing (DFM) commands, and design for validation (DFV) commands, etc.

Figure 3:
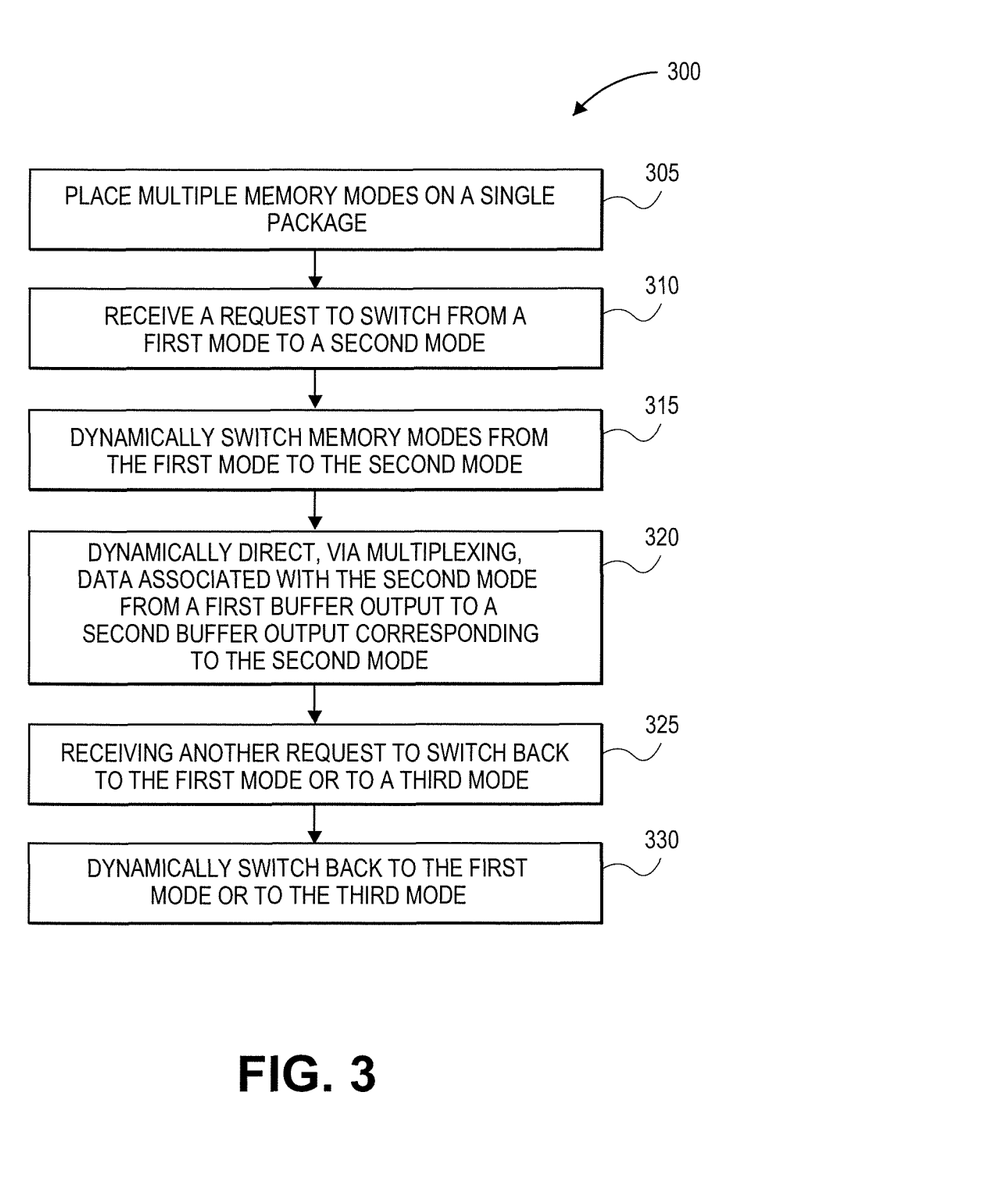
FIG. 3 illustrates a method for employing and facilitating multiple memory modes on a single memory package according to one embodiment of the invention.

FIG. 3 illustrates a method for employing and facilitating multiple memory modes on a single memory package according to one embodiment of the invention. Method 300 may be performed by processing logic that may comprise hardware (e.g., circuitry, dedicated logic, programmable logic, etc.), software (such as instructions run on a processing device), or a combination thereof. In one embodiment, method 300 may be performed by the dynamic multi-mode control mechanism 102 of FIG. 1.

Method 300 begins at block 305 with placing of multiple memory modes on a single package or motherboard that is then made part a computing system. This placement technique may be accomplished at the time of manufacturing of the motherboard. At block 310, a first request is received from a user to switch a first (current) memory mode (e.g., interleaved mode) to a second (another) memory mode (e.g., non-interleaved mode) to switch from, for example, LPDDRx memory device to DDRx memory mode. In one embodiment, at block 315, in response to the user request, the switch logic of the dynamic multi-mode control mechanism of FIG. 1 switches the first mode to the second mode.

In one embodiment, at block 320, upon switching of the modes, such as from the first mode to the second mode, the multiplex output buffer logic of the control mechanism of FIG. 1 dynamically directs or routes any data associated with the second mode from a first output buffer (corresponding to the first mode) to a second output buffer corresponding to the second mode. A second user request to perform another switching of modes (e.g., switching back to the first mode or to another mode, e.g., a third mode) may be received at block 325. At block 330, as with the first request, in response to the second request, another switch and appropriate routing of data is performed.

Figure 4:
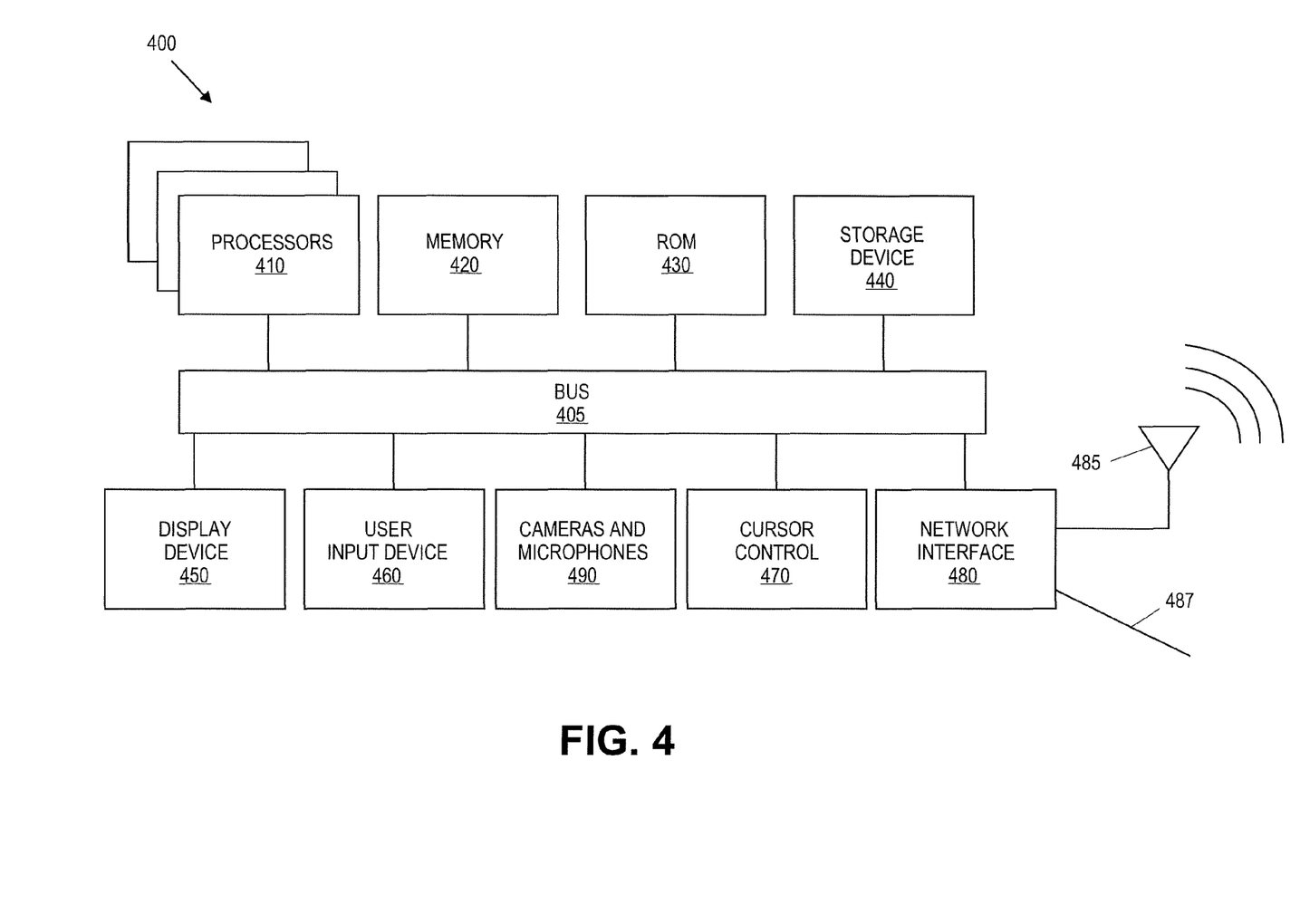
FIG. 4 is block diagram of a computer system suitable for implementing embodiments of the present disclosure according to one embodiment of the invention.

FIG. 4 illustrates an embodiment of a computing system 400. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components.

Computing system 400 includes bus 405 (or a link, an interconnect, or another type of communication device to communicate information) and processor 410 coupled to bus 405 that may process information. While computing system 400 is illustrated with a single processor, electronic system 400 and may include multiple processors and/or co-processors, such as one or more of central processors, graphics processors, and physics processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, or cursor direction keys to communicate direction information and command selections to processor 410 and to control cursor movement on display 450.

Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), wide area network (WAN), metropolitan area network (MAN), personal area network (PAN), an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may including one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments. Specifics in the examples may be used anywhere in one or more embodiments. The various features of the different embodiments may be variously combined with some features included and others excluded to suit a variety of different applications. Some embodiments pertain to a method comprising: maintaining a plurality of memory modes on a single memory package at a motherboard of a computing system, wherein the plurality of memory modes are associated with a plurality of physical organizations of memory devices; receiving a request to switch from a first memory mode to a second memory mode of the plurality of memory mode; and dynamically switching from the first memory mode to the second memory mode, in response to the request.

Embodiments include any of the above methods further comprising dynamically rerouting of data associated with the second memory mode to a second output buffer corresponding to the second memory mode from a first output buffer associated with the first memory mode, wherein the data includes one or more of memory-mapped input/output (MMIO) access data, channel control signals, switching data, command signals, and design-for (DFx) commands including one or more of design for test (DFT) commands, design for debug (DFD) commands, design for manufacturing (DFM) commands, and design for validation (DFV) commands.

Embodiments include any of the above methods wherein dynamic rerouting is performed via multiplexing.

Embodiments include any of the above methods wherein the first memory mode comprises an interleaved mode.

Embodiments include any of the above methods wherein the interleaved mode is associated with a low power double data rate (DDR) memory device of the plurality of memory devices.

Embodiments include any of the above methods wherein the first memory mode comprises a non-interleaved mode.

Embodiments include any of the above methods wherein the non-interleaved mode is associated with a low power double data rate (LPDDR) memory device of the plurality of memory devices.

Embodiments include any of the above methods wherein the plurality of memory modes further reside on the motherboard or a dual in-line memory module (DIMM).

Embodiments include any of the above methods further comprising communicating, via a memory controller on the memory package, with the plurality of memory modes residing at the memory package, the motherboard, or the DIMM.

Some embodiments pertain to a memory controller comprising: a multi-mode control mechanism having first logic to maintain a plurality of memory modes on a single memory package at a motherboard of a computing system, wherein the plurality of memory modes are associated with a plurality of physical organizations of memory devices; second logic to receive a request to switch from a first memory mode to a second memory mode of the plurality of memory mode; and third logic to dynamically switch from the first memory mode to the second memory mode, in response to the request.

Embodiments include the memory controller above wherein the multi-mode control mechanism further comprises forth logic to dynamically reroute of data associated with the second memory mode to a second output buffer corresponding to the second memory mode from a first output buffer associated with the first memory mode, wherein the data includes one or more of memory-mapped input/output (MMIO) access data, channel control signals, switching data, command signals, and design-for (DFx) commands including one or more of design for test (DFT) commands, design for debug (DFD) commands, design for manufacturing (DFM) commands, and design for validation (DFV) commands.

Embodiments include the memory controller above wherein dynamic rerouting is performed via multiplexing.

Embodiments include the memory controller above wherein the first memory mode comprises an interleaved mode.

Embodiments include the memory controller above wherein the interleaved mode is associated with a double data rate (DDR) memory device of the plurality of memory devices.

Embodiments include the memory controller above wherein the first memory mode comprises a non-interleaved mode.

Embodiments include the memory controller above wherein the non-interleaved mode is associated with a low power double data rate (LPDDR) memory device of the plurality of memory devices.

Embodiments include the memory controller above wherein the plurality of memory modes further reside on the motherboard or a dual in-line memory module (DIMM).

Embodiments include the memory controller above further comprising fifth logic to facilitate communication between the memory controller on the memory package with the plurality of memory modes residing at the memory package, the motherboard, or the DIMM.

In another embodiment, a system comprises: a plurality of memory devices at a computing system; a plurality of physical organizations associated with the plurality of memory devices; and a multi-mode control mechanism to maintain a plurality of memory modes on a single memory package of a computing system, wherein the plurality of memory modes are associated with the plurality of physical organizations; receive a request to switch from a first memory mode to a second memory mode of the plurality of memory mode; and dynamically switching from the first memory mode to the second memory mode, in response to the request.

Embodiments include the system above wherein the multi-mode control mechanism if further to dynamically reroute of data associated with the second memory mode to a second output buffer corresponding to the second memory mode from a first output buffer associated with the first memory mode, wherein the data includes one or more of memory-mapped input/output (MMIO) access data, channel control signals, switching data, command signals, and design-for (DFx) commands including one or more of design for test (DFT) commands, design for debug (DFD) commands, design for manufacturing (DFM) commands, and design for validation (DFV) commands.

Embodiments include the system above wherein dynamic rerouting is performed via multiplexing.

Embodiments include the system above wherein the first memory mode comprises an interleaved mode.

Embodiments include the system above wherein the interleaved mode is associated with a double data rate (DDR) memory device of the plurality of memory devices.

Embodiments include the system above wherein the first memory mode comprises a non-interleaved mode.

Embodiments include the system above wherein the non-interleaved mode is associated with a low power double data rate (LPDDR) memory device of the plurality of memory devices.

Embodiments include the system above wherein the plurality of memory modes further reside on the motherboard or a dual in-line memory module (DIMM).

Other embodiments pertain to an apparatus comprising means for performing any one or more of the operations mentioned above.

Other embodiments pertain to at least one machine-readable comprising a plurality of instructions that in response to being executed on a computing device, causes the computing device to carry out a method according to any one or more of the operations mentioned above.

Other embodiments pertain to an apparatus comprising means for performing any one or more of the operations mentioned above.

Other embodiments pertain to a computing device arranged to perform a method according to any one or more of the operations mentioned above.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:
maintaining a plurality of memory modes via a universal pin matrix residing on a single memory package at a motherboard of a computing system, wherein the plurality of memory modes are associated with a plurality of physical organizations of memory devices, wherein the universal pin matrix is compatible with the plurality of memory modes, wherein each memory mode is independent of or incompatible with other memory modes of the plurality of memory modes;

receiving a request to switch from a first memory mode to a second memory mode of the plurality of memory modes, wherein the first memory mode comprises an interleaved mode and the second memory mode comprises a non-interleaved mode; and dynamically switching, via changing of a control bit, from the first memory mode to the second memory mode, in response to the request, wherein dynamic switching includes dynamically routing data from a first output buffer associated with the first memory mode to a second output buffer associated with the second memory mode, wherein the data includes types of data corresponding to types of the plurality of memory modes, wherein the data relates to data signals, channel control signals, memory-mapped input/output (I/O) registers or addresses, sideband control signals, and design test controls.

2. The method of claim 1, further comprising dynamically rerouting of data associated with the second memory mode to a second output buffer corresponding to the second memory mode from a first output buffer associated with the first memory mode, wherein the data includes one or more of memory-mapped input/output (MMIO) access data, channel control signals, switching data, command signals, and design-for (DFx) commands including one or more of design for test (DFT) commands, design for debug (DFD) commands, design for manufacturing (DFM) commands, and design for validation (DFV) commands.

3. The method of claim 2, wherein dynamic rerouting is performed via multiplexing.

4. The method of claim 1, wherein the interleaved mode is associated with a double data rate (DDR) memory device of the plurality of memory devices.

5. The method of claim 1, wherein the non-interleaved mode is associated with a low power double data rate (LPDDR) memory device of the plurality of memory devices.

6. The method of claim 1, wherein the plurality of memory modes further reside on the motherboard or a dual in-line memory module (DIMM).

7. The method of claim 1, further comprising communicating, via a memory controller on the memory package, with the plurality of memory modes residing at the memory package, the motherboard, or the DIMM.

8. A memory controller comprising:
a multi-mode control mechanism having
first logic to maintain a plurality of memory modes via a universal pin matrix residing on a single memory package at a motherboard of a computing system, wherein the plurality of memory modes are associated with a plurality of physical organizations of memory devices, wherein the universal pin matrix is compatible with the plurality of memory modes, wherein each memory mode is independent of or incompatible with other memory modes of the plurality of memory modes;

second logic to receive a request to switch from a first memory mode to a second memory mode of the plurality of memory modes, wherein the first memory mode comprises an interleaved mode and the second memory mode comprises a non-interleaved mode; and third logic to dynamically switch, via changing of a control bit, from the first memory mode to the second memory mode, in response to the request, wherein dynamic switching includes dynamically routing data from a first output buffer associated with the first memory mode to a second output buffer associated with the second memory mode, wherein the data includes types of data corresponding to types of the plurality of memory modes, wherein the data relates to data signals, channel control signals, memory-mapped input/output (I/O) registers or addresses, sideband control signals, and design test controls.

9. The memory controller of claim 8, wherein the multi-mode control mechanism further comprises forth logic to dynamically reroute of data associated with the second memory mode to a second output buffer corresponding to the second memory mode from a first output buffer associated with the first memory mode, wherein the data includes one or more of memory-mapped input/output (MMIO) access data, channel control signals, switching data, command signals, and design-for (DFx) commands including one or more of design for test (DFT) commands, design for debug (DFD) commands, design for manufacturing (DFM) commands, and design for validation (DFV) commands.

10. The memory controller of claim 8, wherein dynamic rerouting is performed via multiplexing.

11. The memory controller of claim 8, wherein the interleaved mode is associated with a double data rate (DDR) memory device of the plurality of memory devices.

12. The memory controller of claim 8, wherein the non-interleaved mode is associated with a low power double data rate (LPDDR) memory device of the plurality of memory devices.

13. The memory controller of claim 8, wherein the plurality of memory modes further reside on the motherboard or a dual in-line memory module (DIMM).

14. The memory controller of claim 8, further comprising fifth logic to facilitate communication between the memory controller on the memory package with the plurality of memory modes residing at the memory package, the motherboard, or the DIMM.

15. A system comprising:
a plurality of memory devices at a computing system;
a plurality of physical organizations associated with the plurality of memory devices; and
a multi-mode control mechanism to
maintain a plurality of memory modes via a universal pin matrix residing on a single memory package of a computing system, wherein the plurality of memory modes are associated with the plurality of physical organizations, wherein the universal pin matrix is compatible with the plurality of memory modes, wherein each memory mode is independent of or incompatible with other memory modes of the plurality of memory modes;
receive a request to switch from a first memory mode to a second memory mode of the plurality of memory modes, wherein the first memory mode comprises an interleaved mode and the second memory mode comprises a non-interleaved mode; and
dynamically switching, via changing of a control bit, from the first memory mode to the second memory mode, in response to the request, wherein dynamic switching includes dynamically routing data from a first output buffer associated with the first memory mode to a second output buffer associated with the second memory mode, wherein the data includes types of data corresponding to types of the plurality of memory modes, wherein the data relates to data signals, channel control signals, memory-mapped input/output (I/O) registers or addresses, sideband control signals, and design test controls.

16. The system of claim 15, wherein the multi-mode control mechanism if further to dynamically reroute of data associated with the second memory mode to a second output buffer corresponding to the second memory mode from a first output buffer associated with the first memory mode, wherein the data includes one or more of memory-mapped input/output (MMIO) access, channel control signals, switching data, command signals, and design-for (DFx) commands including one or more of design for test (DFT) commands, design for debug (DFD) commands, design for manufacturing (DFM) commands, and design for validation (DFV) commands.

17. The system of claim 15, wherein dynamic rerouting is performed via multiplexing.

18. The system of claim 15, wherein the interleaved mode is associated with a double data rate (DDR) memory device of the plurality of memory devices.

19. The system of claim 15, wherein the non-interleaved mode is associated with a low power double data rate (LPDDR) memory device of the plurality of memory devices.

20. The system of claim 15, wherein the plurality of memory modes further reside on the motherboard or a dual in-line memory module (DIMM).

21. The system of claim 15, further comprises a memory controller on the memory package communicating with the plurality of memory modes residing at the memory package, the motherboard, or the DIMM.

22. The method of claim 3, wherein multiplexing is performed such that some or all the data or data signals to output data block or buffers, wherein the data blocks remain unchanged or altered based on a portion of the data relating to a corresponding data block, wherein the data or data signals are multiplexed via one or more of channel control signals, memory mapped I/O registers or addresses, design for test controls, and sideband control signals.

23. The memory controller of claim 10, wherein multiplexing is performed such that some or all the data or data signals to output data block or buffers, wherein the data blocks remain unchanged or altered based on a portion of the data relating to a corresponding data block, wherein the data or data signals are multiplexed via one or more of channel control signals, memory mapped I/O registers or addresses, design for test controls, and sideband control signals.

24. The system of claim 17, wherein multiplexing is performed such that some or all the data or data signals to output data block or buffers, wherein the data blocks remain unchanged or altered based on a portion of the data relating to a corresponding data block, wherein the data or data signals are multiplexed via one or more of channel control signals, memory mapped I/O registers or addresses, design for test controls, and sideband control signals.

* * * * *